(12) United States Patent
Suu et al.

(10) Patent No.: US 8,205,083 B2
(45) Date of Patent: Jun. 19, 2012

(54) SYSTEM AND METHOD FOR PROVIDING PROGRAM INFORMATION, AND RECORDING MEDIUM USED THEREFOR

(75) Inventors: Hiroshi Suu, Chigasaki (JP); Akira Miura, Sagamihara (JP); Akihiro Kasahara, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1051 days.

(21) Appl. No.: 12/104,130

(22) Filed: Apr. 16, 2008

(65) Prior Publication Data
US 2008/0270796 A1 Oct. 30, 2008

(30) Foreign Application Priority Data
Apr. 17, 2007 (JP) ................. 2007/108464

(51) Int. Cl.
*H04L 29/06* (2006.01)
(52) U.S. Cl. ........ 713/169; 713/168; 713/171; 713/172; 713/173
(58) Field of Classification Search .................. None
See application file for complete search history.

(56) References Cited

U.S. PATENT DOCUMENTS

| | | | | |
|---|---|---|---|---|
| 7,047,408 | B1* | 5/2006 | Boyko et al. ................ | 713/169 |
| 7,373,507 | B2* | 5/2008 | Simms ......................... | 713/168 |
| 2003/0221103 | A1* | 11/2003 | Hirota et al. ................ | 713/172 |
| 2004/0039911 | A1* | 2/2004 | Oka et al. .................... | 713/175 |
| 2005/0210249 | A1* | 9/2005 | Lee et al. .................... | 713/168 |
| 2005/0210279 | A1* | 9/2005 | Lee et al. .................... | 713/194 |
| 2006/0154605 | A1* | 7/2006 | Ham ............................ | 455/41.2 |
| 2006/0281442 | A1* | 12/2006 | Lee et al. .................... | 455/412.2 |
| 2007/0101143 | A1* | 5/2007 | Iwata et al. ................. | 713/172 |
| 2007/0133803 | A1* | 6/2007 | Saito et al. ................. | 380/267 |
| 2007/0157318 | A1* | 7/2007 | Lee et al. .................... | 726/27 |
| 2008/0059797 | A1* | 3/2008 | Tokuno et al. .............. | 713/171 |
| 2008/0155260 | A1* | 6/2008 | Perez et al. ................. | 713/169 |

FOREIGN PATENT DOCUMENTS

| | | |
|---|---|---|
| EP | 1 655 668 A1 | 5/2006 |
| JP | 2002-237808 | 8/2002 |
| JP | 2003-283417 | 10/2003 |

(Continued)

OTHER PUBLICATIONS

Content Protection for Recordable Media Specification, SD Memory Card Book, May 28, 2001, 4C Entity LLC, Revision 0.95.*

(Continued)

*Primary Examiner* — Krista Zele
*Assistant Examiner* — Matthew Lindsey
(74) *Attorney, Agent, or Firm* — Finnegan, Henderson, Farabow, Garrett & Dunner, L.L.P.

(57) ABSTRACT

A system for providing program information has a user terminal, a recording medium capable of reading information therefrom and writing information thereto through a command issued by the user terminal, and a server connected to the user terminal via a network, and provides program information from the server to the recording medium. The recording medium has a first control unit that performs a first mutual authentication operation with a first storage unit capable of writing program information thereto and the user terminal, and that executes a command to write program information to the first storage unit only if the first mutual authentication operation is successful. The user terminal performs a second mutual authentication operation with the server, obtains program information transmitted from the server if the second mutual authentication operation is successful, and issues a command to write the program information to the first storage unit of the recording medium.

9 Claims, 12 Drawing Sheets

FOREIGN PATENT DOCUMENTS

| | | |
|---|---|---|
| JP | 2006-126891 | 5/2006 |
| JP | 2006-293874 | 10/2006 |
| JP | 2007-13780 | 1/2007 |
| JP | 2007-52633 | 3/2007 |
| JP | 2007-60066 | 3/2007 |
| WO | WO 03/007298 A2 | 1/2003 |

OTHER PUBLICATIONS

Advanced Access Content System (AACS), Introduction and Common Cryptographic Elements, Feb. 17, 2006, Intel Corporation, International Business Machines Corporation, Matsushita Electric Intustrial Co., Ltd., Microsoft Corportation, Sony Corporation, Toshiba Corporation, the Walt Disney Company, Warner Bros., Revision 0.91.*

"Content Protection for Recordable Media Specification," 4C Entity (May 3, 2007), pp. i-x and 1-26.

U.S. Appl. No. 12/175,014, filed Jul. 17, 2008, to Kasahara.

European Search Report issued by the European Patent Office on Dec. 27, 2011, for European Patent Application No. 08007505.4.

Notification of Reason(s) for Refusal issued by the Japanese Patent Office on Apr. 24, 2012, for Japanese Patent Application No. 2007-108464, and English-language translation thereof.

* cited by examiner

FIG. 7

| Bit Byte | 7 | 6 | 5 | 4 | 3 | 2 | 1 | 0 |
|---|---|---|---|---|---|---|---|---|
| 0 | Manufacturer ID (MID: 1 byte) assigned by 4C Entity, LLC | | | | | | | |
| 1 | OEM/Application ID (OID: 2 byte) assigned by SD-3C, LLC | | | | | | | |
| 2 | | | | | | | | |
| 3 | Product Revision (PRV: 1 byte) | | | | | | | |
| 4 | Product serial number (PSN: 4byte) | | | | | | | |
| 5 | | | | | | | | |
| 6 | | | | | | | | |
| 7 | | | | | | | | |

SYSTEM AND METHOD FOR PROVIDING PROGRAM INFORMATION, AND RECORDING MEDIUM USED THEREFOR

CROSS-REFERENCE TO RELATED APPLICATIONS

This application is based upon and claims the benefit of priority from the prior Japanese Patent Application No. 2007-108464, filed on Apr. 17, 2007, the entire contents of which are incorporated herein by reference.

BACKGROUND OF THE INVENTION

1. Field of the Invention

The present invention relates to a system and method for providing program information from a server to a recording medium, and a recording medium used for the method.

2. Description of the Related Art

Recently, users may use communication terminals connected to communication networks such as the Internet to download and view digitized content information.

However, since content information can be easily copied, fraudulent actions tend to be taken violating copyrights. From the viewpoint of protecting content information from those fraudulent actions, the content information is generally recorded after being encrypted with an encryption key and it is decrypted at the time of reproduction. This type of content protection technology includes CPRM (Content Protection for Prerecorded Media), which employs standardized encryption key schemes, such as SD-Audio, SD-Video, SD-ePublish (SD electronic publishing) (see, for example, Non-Patent Document 1: 4C Entity, LLC, [online] (<URL:http://www.4Centity.com/> (Internet search, Feb. 13, 2006)). The encryption key scheme employed in this Non-Patent Document 1 is a single-key encryption scheme where a title key is encrypted once with a media-specific key. On the other hand, consideration is now being given to dual-key encryption schemes where a content key is encrypted twice with a user key and a media-specific key (see, for example, Patent Document 1: Japanese Patent Laid-Open No. 2007-13780). This type of dual-key encryption schemes is employed in, e.g., MQbic®.

That is, certain industries have concerned the use of recording media as SRM (Secure Removable Media) in different DRM (Digital Rights Management) techniques using the above-mentioned encryption schemes. In this case, such recording media include SD cards, etc.

However, when recording media are used as SRM in each of the DRM techniques, in some instances, only functions that are previously provided in such recording media may not suffice. Therefore, there is a need for recording media that enables functions (program information) to be added or updated that are required for each of the DRM techniques. Besides, such recording media requires an environment where the added functions are executed.

However, if the added/updated functions (program information) as mentioned above cannot be securely accepted by the recording media, the following problems occur: Some occasions may arise where the addition/update of functions may be performed on a recording medium that is held by an unauthorized user masquerading as the legitimate user (masquerading problem). Consequently, when such masquerade is practiced in the recording medium, the legitimate recording medium may be susceptible to attacks such as addition of malicious functions (program information) or data manipulation through, e.g., program function analysis performed by the unauthorized user. That is, such recording medium itself could create some security holes.

SUMMARY OF THE INVENTION

The present invention provides a system for providing program information according to one aspect of the present invention, comprising a user terminal managed by a user, a recording medium capable of reading information therefrom and writing information thereto through a command issued by the user terminal, and a server connected to the user terminal via a network, the system providing program information from the server to the recording medium, wherein the recording medium has a first storage unit capable of writing program information thereto, and a first control unit capable of performing a first mutual authentication operation with the user terminal and executing a command to write program information to the first storage unit only if the first mutual authentication operation is successful, and the user terminal performs a second mutual authentication operation with the server, obtains program information transmitted from the server if the second mutual authentication operation is successful, and issues a command to write the program information to the first storage unit of the recording medium.

The present invention also provides a method for providing program information according to one aspect of the present invention, in a system including a user terminal managed by a user, a recording medium capable of reading information therefrom and writing information thereto through a command issued by the user terminal, and a server connected to the user terminal via a network, the method providing program information from the server to the recording medium, and comprising: a first mutual authentication step of causing the recording medium and the user terminal to perform a first mutual authentication operation; a step of executing a command to write program information to a first storage unit of the recording medium if the first mutual authentication operation is successful in the first mutual authentication step; a second mutual authentication step of causing the recording medium and the server to perform a second mutual authentication operation through the user terminal; a step of obtaining program information transmitted from the server if the second mutual authentication operation is successful in the second mutual authentication step; and a step of issuing a command to write program information to the first storage unit of the recording medium.

The present invention further provides a recording medium according to one aspect of the present invention, comprising a first storage unit capable of writing program information thereto, a first control unit performing a first mutual authentication operation with a user terminal managed by a user, wherein the first control unit performing, through the user terminal, a second mutual authentication operation with a server connected to the user terminal via a network only if the first mutual authentication operation is successful, and writing program in format ion transmitted from the server to the first storage unit only if the second mutual authentication operation is successful.

BRIEF DESCRIPTION OF THE DRAWINGS

FIG. 7 is a diagram illustrating media identifier information IDm;

DETAILED DESCRIPTION OF THE EMBODIMENTS

A system for providing program information according to an embodiment of the present invention will now be described below with reference to the accompanying drawings. In this description, for purposes of illustration, information B encrypted with information A is represented as Enc (A:B). Besides, a system for providing program information according to an embodiment of the present invention includes those using dual-key encryption schemes, which is described in detail below. That is, using the dual-key encryption schemes, program P is encrypted twice with program key information Kp and user key information Ku, as described below.

First Embodiment

Figure 1:
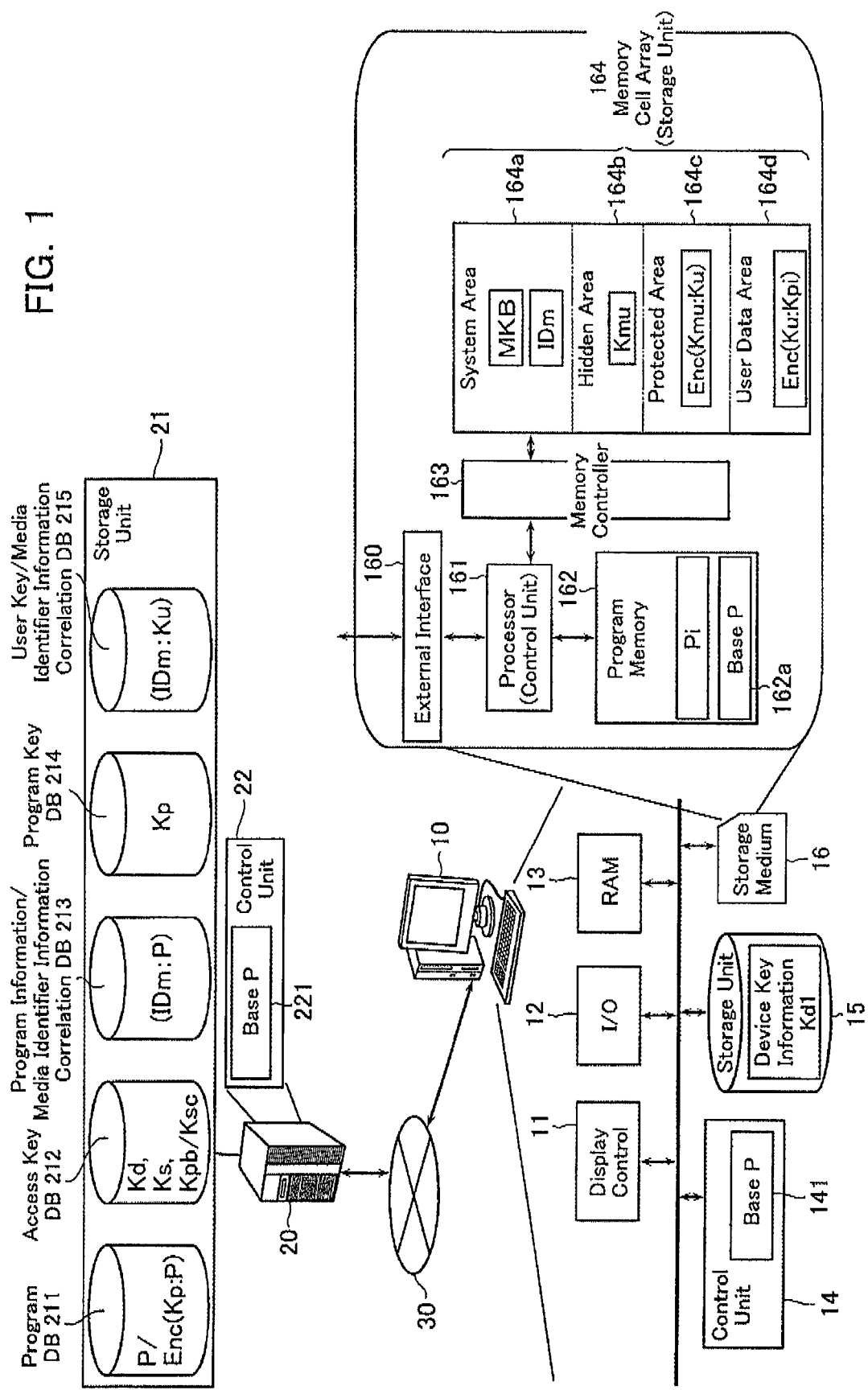
FIG. 1 is a schematic diagram of a system for providing program information according to a first embodiment of the present invention.

FIG. 1 is a schematic diagram of a system for providing program information according to a first embodiment of the present invention. As illustrated in FIG. 1, the system for providing program information includes a user terminal 10, a recording medium 16, and a server 20. The user terminal 10 is connected through a network 30 such as the Internet to the server 20. The system for providing program information has a characteristic that a mutual authentication is performed by the recording medium 16 between the user terminal 10 and the server 20.

Figure 2A:
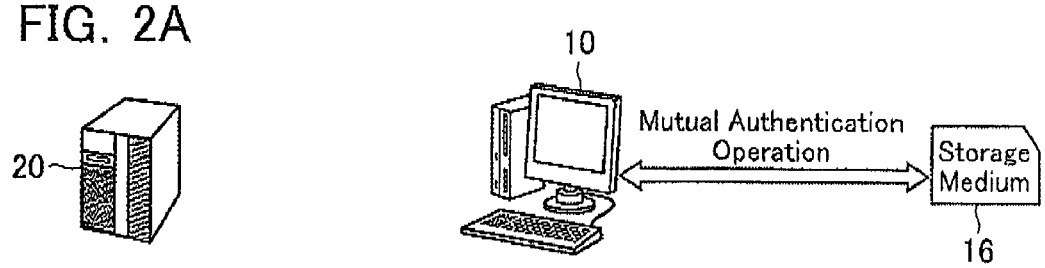
FIG. 2 is a schematic diagram illustrating operations of the system for providing program information according to the first embodiment of the present invention.
Figure 2B:
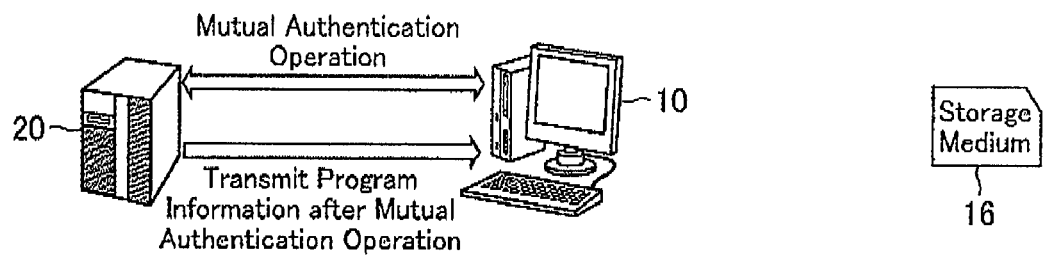
Figure 2C:
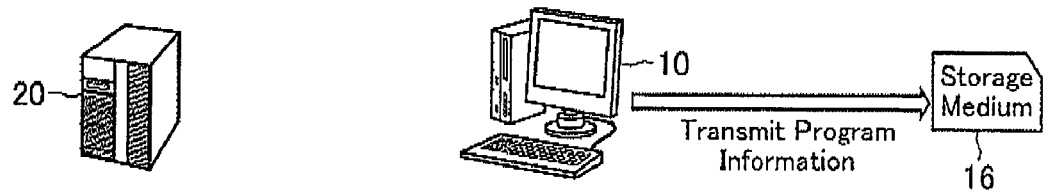

As illustrated in FIG. 2A, the recording medium 16 performs a mutual authentication operation with the user terminal 10 (first mutual authentication operation). On the other hand, as illustrated in FIG. 22, the user terminal 10 performs another mutual, authentication operation with the server 20 (second mutual authentication operation). As a result, in the system for providing program information of this embodiment, the recording medium 16 obtains mutual authentication with the user terminal 10 as well as the server 20. In addition, the first and second mutual authentication operations may be performed in either order. Consequently, the second mutual authentication operation may be performed first in the following manner: Firstly, the user terminal 10 receives program information from the server 20 and stores it in a storage unit 15 of the user terminal 10. Then, it performs a first mutual authentication operation and stores the program information transmitted from they server 20 in the recording medium 16.

It should be noted that while only a single user terminal 10 and a single server 20 is illustrated in FIG. 1, the present invention is not limited to this configuration. For example, multiple user terminals 10 and servers 20 may be arranged therein. In addition, the user terminal 10 may be a mobile phone instead of a personal computer, or it may be other terminal positioned in Internet cafes, convenience stores, gas stations, etc., and shared among the general public, not limited to a terminal privately owned by a user.

The user terminal 10 includes a display control unit 11, an input/output (I/O) unit 12, a RAM 13, a control unit 14 such as a CPU, and a storage unit 15 such as an HDD (Hard Disc Drive). Besides, the user terminal 10 is configured to be able to read/write information from/to the recording medium 16.

The control unit 14 executes program based on the program information stored in the storage unit 15. For example, the control unit 14 reads base program 141 from the storage unit 15 for execution. The base program 141 has encryption/decryption functions and performs mutual authentication, key exchange, and cryptographic communications with the recording medium 16. The storage unit 15 stores device key information Kd1 that is necessary for first mutual authentication operations for each device (user terminal). The storage unit 15 may also store, e.g., secret key information Ksc that is paired with each of common secret key information Kcs, public key information Kpb, and public key information Kpb necessary for a second mutual authentication with the server 20.

The recording medium 16 includes a processor (control unit) 161, a program memory 162, a memory controller 163, and a memory cell array (storage unit) 164.

The processor 161 reads, e.g., content information stored in the memory cell array 164 or program information stored in the program memory 162 and executes program based on that program information. For example, the program memory 162 is a randomly accessible NOR-type EEPROM, where program information is stored and read in response to commands from the processor 161.

Some program has been previously stored in the program memory 162, such as base program 162a for controlling the overall base operations of the recording medium 16. The base program 162a has encryption/decryption functions and performs mutual authentication, key exchange, and cryptographic communications with the outside world of the recording medium 16. The base program 162a is executed by the processor 161. The program memory 162 stores those pieces of program information P that are downloaded as needed. The program information P is divided into multiple pieces of information (P1, P2, . . . , Pm), which are hereinafter collectively referred to as "program information P" as deemed appropriate. Alternatively, only the base program 162a may be stored in the program memory 162, and the downloaded program information P may be stored in the memory cell array 164. Then, the program information P may be transferred to and stored in the program memory 162 each time the recording medium 316 is attached to the user terminal 10. Further, those pieces of program information P downloaded as needed are encrypted with encryption key information (program key information Kp) and stored in a user data area 164d (Enc (Kp:P)). Such program information P is divided into multiple pieces of information (P1, P2, ..., Pm), which are then encrypted with program keys (Kp1, Kp2, ..., Kpn), respectively. The multiple program keys (Kp1, Kp2, ..., Kpn) are hereinafter collectively referred to as "program key information Kp".

The memory controller 163 controls operations on the memory cell, array 164 such as write/read/erase operations according to instructions from the processor 161. For example, the memory controller 163 reads write instructions and data sent by the processor 161 to determine an address of the memory cell array 164 to which the data is to be written. The memory controller 163 monitors via an external interface 160 whether an access by the processor 161 is directed to a protected area 164c in the memory cell array 164 mentioned below. If it is determined by the memory controller 163 that the access is directed to any areas external to the protected area 164c, then the access is prohibited. In this case, for example, the command execution would result in an out-of-bounds access error. That is, the memory controller 163 divides and manages the memory cell array 164 into multiple areas for each application.

For example, the memory cell array 164 is a NAND-type EEPROM, which stores program information and other information. As mentioned above, the memory cell array 164 is divided into multiple areas for each application. The resulting areas include a system area 164a, a hidden area 164b, a protected area 164c, and a user data area 164d.

The system area 164a is a read-only area and accessible to the outside world of the recording medium 16. The hidden area 164b is another read-only area referred to by the recording medium 16, but by no means accessible to the outside world. The protected area 164c is such an area that can be read from/written to by the outside world of the recording medium 16 upon successful mutual authentication operation. The user data area 164d is such an area that can be freely read/written to from the outside world of the recording medium 16.

Specifically, key management information MKB (Media Key Block) and media identifier information IDm are stored in the system area 164a.

Meanwhile, media-specific key information Kmu is stored in the hidden area 164b, an encrypted user key Enc (Kmu:Ku) is stored in the protected area 164c, and various types of information such as content information encrypted twice with, e.g., a user key Ku and content key data is stored in the user data area 164d. Wherein, the user key information Ku is used as encryption/decryption keys for the program key information Kp, and also used in common for multiple pieces of encrypted program key information Enc (Ku:Kp1), Enc (Ku:Kp2), and so on.

The server 20 comprises a storage unit 21 such as an HDD and a control unit 22 such as a CPU.

The storage unit 21 has a program database 211, an access key database 212, a program information/media identifier information correlation database 213, a program key database 214, and a user key/media identifier information correlation database 215. The program database 211 stores program information P. The access key database 212 stores access key information through which the server 20 accesses the user terminal 10 or the recording medium 16. The access key database 212 stores, as the access key information, device key information Kd, common secret key information Kcs, public key information Kpb, secret key information Ksc that is paired with the public key information Kpb, etc. The program information/media identifier information correlation database 213 stores information about the manufacturer of the recording medium as well as information for causing the server 20 to select appropriate program information P if corresponding program information P differs for different versions. Based on the media identifier information IDm of the recording medium 16, the server 20 refers to the program information/media identifier information correlation database 213 to select appropriate program information. The program key database 214 stores the program key information Kp. The user key/media identifier information correlation database 215 stores user key information Ku corresponding to the media identifier information IDm. In a variation of this embodiment, the encrypted program information Enc (Kp:P), which results from encryption of program information P with the program key information Kp, may be stored in the program database 211.

The control unit 22 executes base program 221. The base program 221 has encryption/decryption functions and performs mutual authentication, key exchange, and cryptographic communications with the recording medium 16 through the user terminal 10.

Figure 3A:
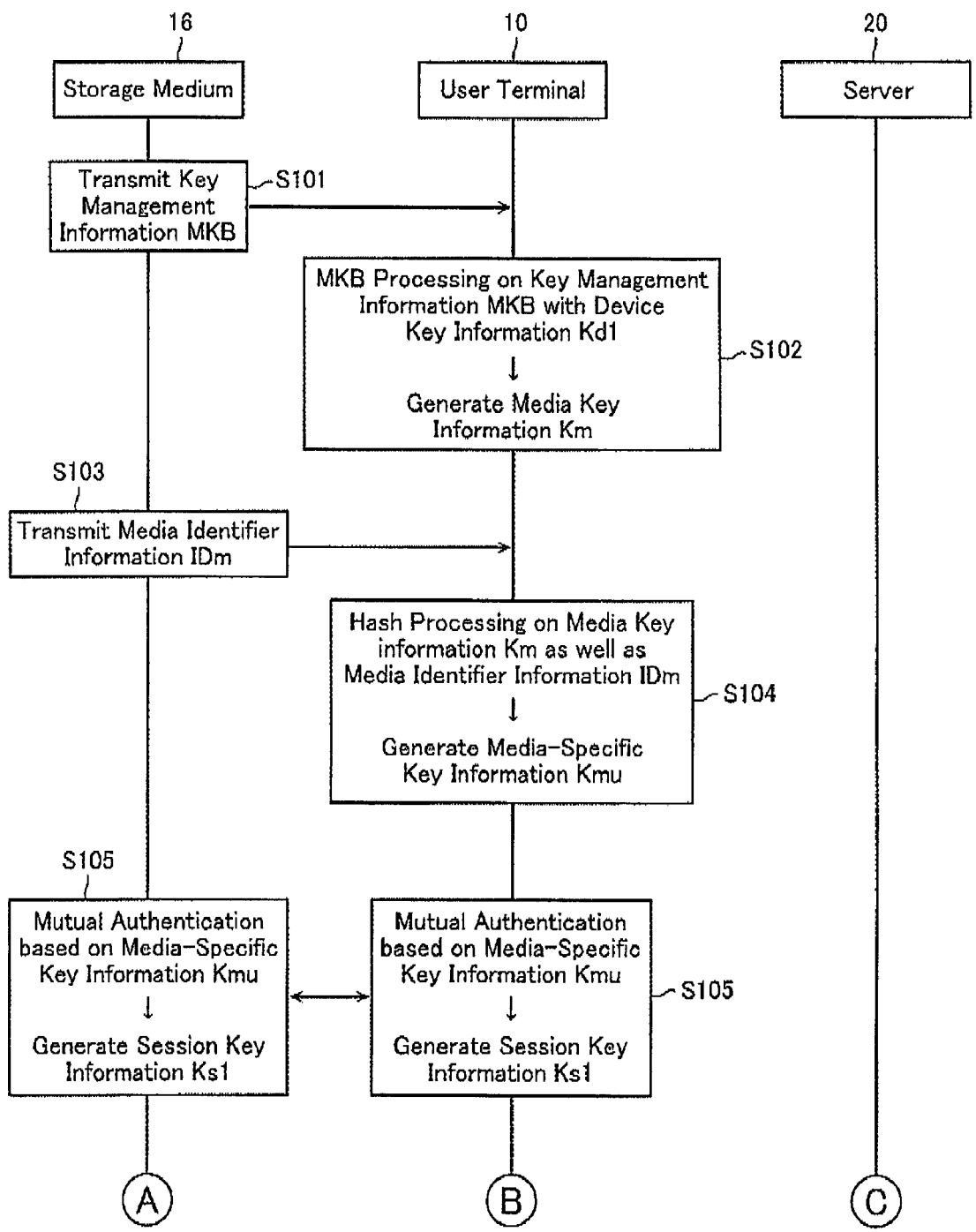
FIG. 3A is a flowchart illustrating operations of the system for providing program information according to the first embodiment of the present invention.
Figure 3B:
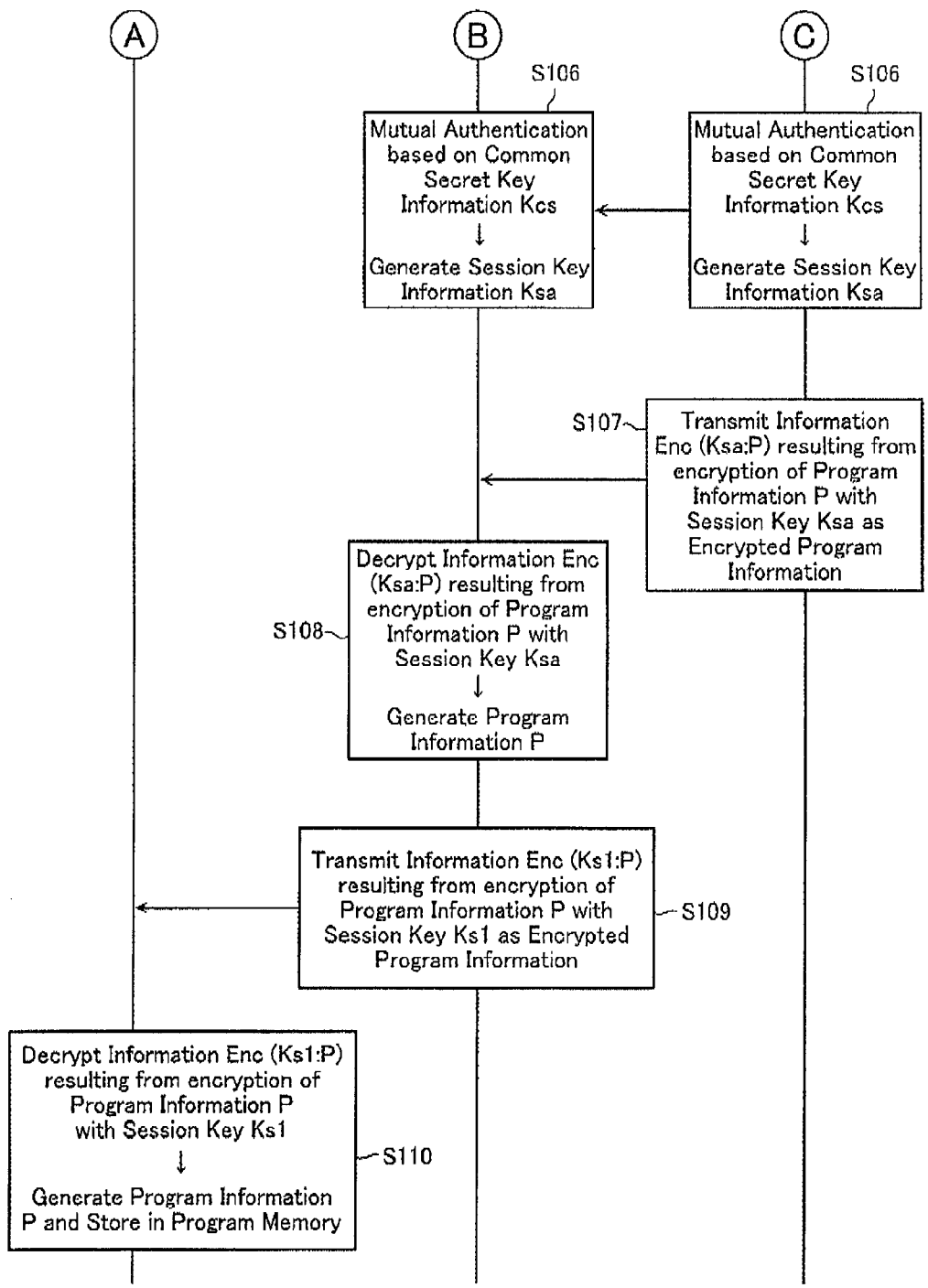
FIG. 3B is a flowchart illustrating operations of the system for providing program information according to the first embodiment of the present invention.

Referring now to FIGS. 3A and 3B, operations of the system for providing program information according to the first embodiment of the present invention will be described below.

As illustrated in FIG. 3A, the recording medium 16 first transmits key management information MKB to the user terminal 10 (step S101).

Then, the user terminal 10 performs MKB processing on the received key management information MKB with device key information Kd1 and generates media key information Km (step S102).

Figure 5:
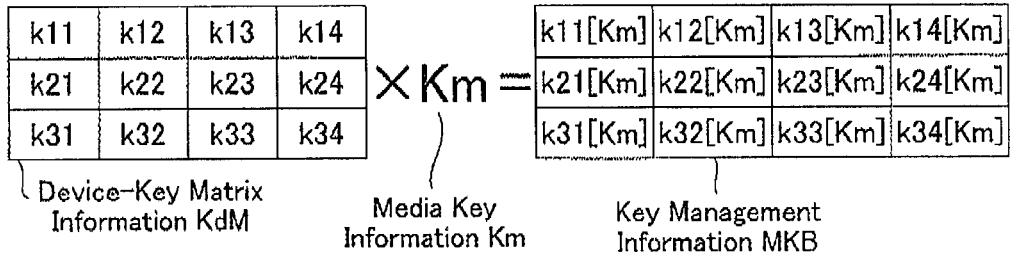
FIG. 5 is a diagram illustrating key management information MKB.
Figure 6:
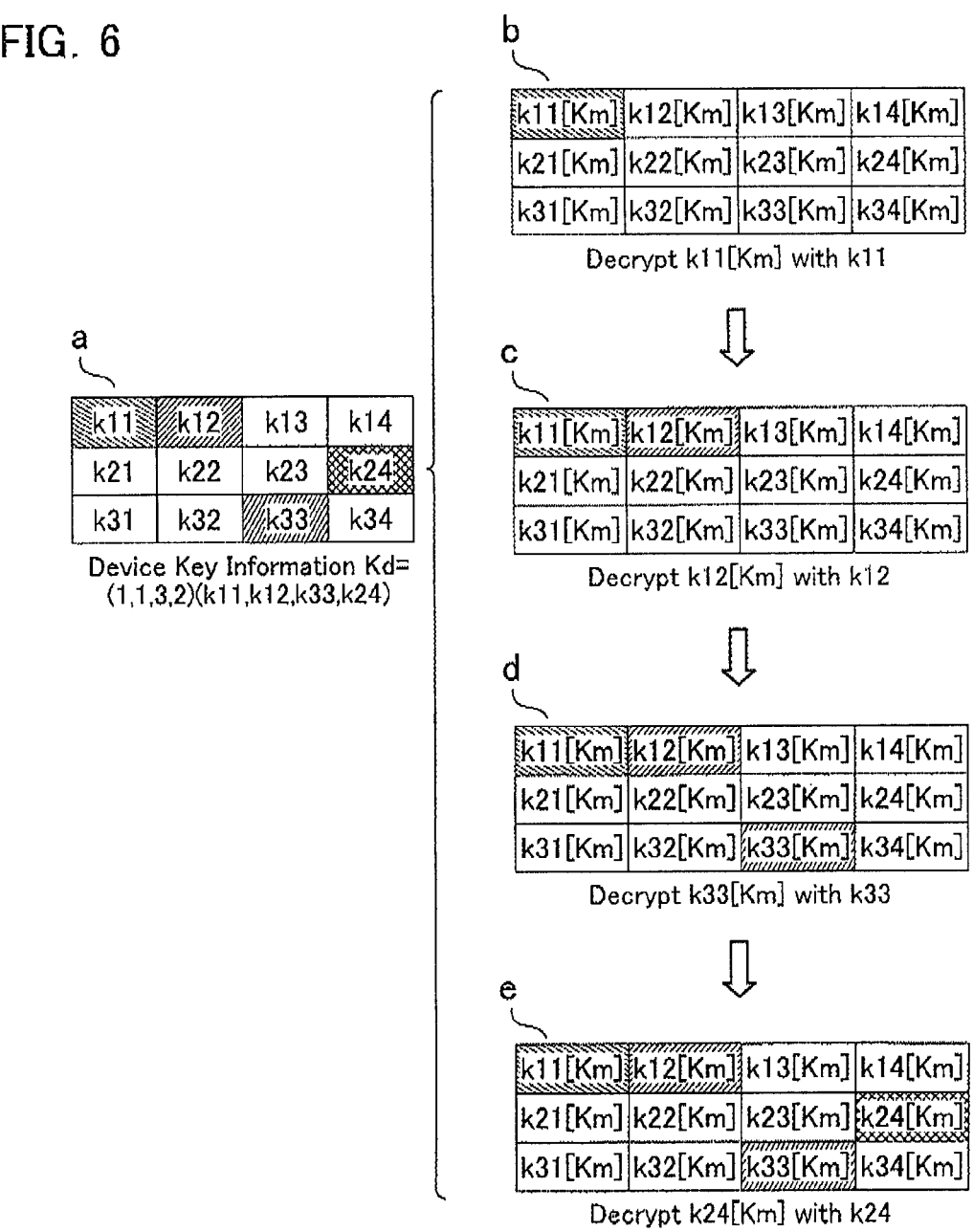
FIG. 6 is a diagram illustrating the MKB processing of step S102 in FIG. 3.
Figure 8:
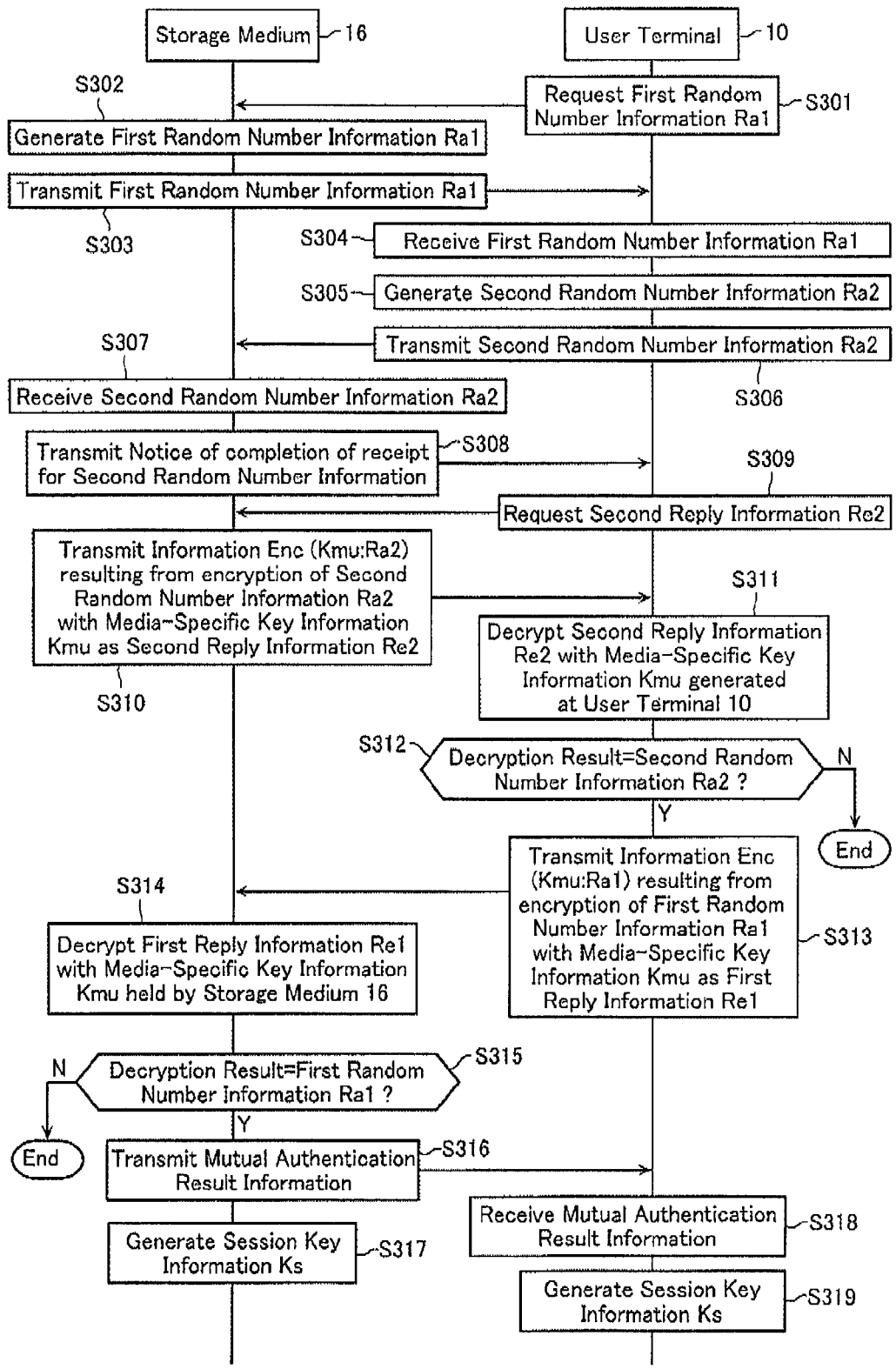
FIG. 8 is a flowchart illustrating the mutual authentication operation of step S105 in FIG. 3.

Referring now to FIGS. 5 and 6, the MKB processing of step S102 will be described below. As illustrated in FIG. 5, the key management information MKB is such information that results from encryption of media key information Km with device-key matrix information KdM. The device-key matrix information KdM has matrix elements and multiple pieces of encryption information k11 to k34 corresponding to the matrix elements.

Then, as illustrated in FIG. 6, the key management information MKB is decrypted with device key information Kd, by which media key information Km is generated. The device key information Kd has vector information to select multiple pieces of encryption information among the matrix elements and decryption information to decrypt the encrypted information according to the vector information. For example, as indicated by label "a" of FIG. 6, the device key information Kd has the following information as vector information: (row 1, column 1), (row 1, column 2), (row 3, column 3), (row 2, column 4). The device key information Kd has decryption information k11, k12, k33, k24 corresponding to the vector information. For symbol representation, Kd=(1, 1, 3, 2) (k11, k12, k33, k24). Besides, as described above, the device key information Kd differs for different devices.

When MKB processing is performed with the device key information Kd, indicated as "a" in FIG. 6, information k11 [Km] in the key management information MKB is first decrypted with the decryption information k11 of the device key information Kd as indicated by label "b" of FIG. 6. If the obtained result of decryption is not equal to the preset invalid information, then, as labeled "c" to "e" in FIG. 6, decryption is performed in a similar way. If all obtained results are not equal to the invalid information in the operation labeled "c" to "e" in FIG. 6, then media key information Km is generated. Besides, although the device-key matrix information KdM and the key management information MKB are illustrated in FIGS. 5 and 6 with three rows and four columns for simplicity, the actual SD card has sixteen rows and sixteen columns.

Returning to FIGS. 3A and 3B, the description is continued below. Subsequent to step S102, the recording medium 16 transmits the media identifier information IDm to the user terminal 10 (step S103). FIG. 7 illustrates details of the media identifier information when a recording medium is an SD memory card. Regarding this SD memory card, the media identifier information includes 8 Bytes information called "Media Identifier", wherein Byte 0 contains information for identifying the manufacturer; Byte 1 to Byte 2 represents the OEM manufacturer of the SD memory card; Byte 3 contains Product Revision information indicating the version of the card; and Byte 4 to Byte 7 represents the product serial number of the SD memory card. As illustrated in the example, the manufacturer of the recording medium and the version of the product may be identified with media identifier information.

The user terminal 10 performs hash processing on the media key information Km as well as the media identifier information IDm to generate media-specific key information Kmu (step S104). That is, the media-specific key information Kmu is such information that results from encryption of the media key information Km with the media identifier information IDm (Kmu=Enc (IDm:Km)). In step S104, the media key information Km is encrypted with the media identifier information IDm, by which the media-specific key information Kmu is generated. In step S104, the media-specific key information Kmu is shared between the recording medium 16 and the user terminal 10.

Then, the user terminal 10 and the recording medium 16 perform a mutual authentication operation, each based on the media-specific key information Kmu generated in step S104 and the media-specific key information Kmu stored in the hidden area 164b, respectively. If it is determined that the mutual authentication operation is successful, then the user terminal 10 and the recording medium 16 generate session key information (common key information) Ks1 (step S105).

In this way, the mutual authentication operation (first mutual authentication operation) is completed between the recording medium 16 and the user terminal 10, enabling the user terminal 10 and the recording medium 16 to initiate cryptographic communications based on the session key information Ks1. Wherein, as used herein, the term "cryptographic communications" refers to such communication operations where a sender transmits information encrypted with the session key information Ks1, and a receiver decrypts the received information with the session key information Ks1. For example, the session key information Ks1 may be used for encryption of program information P or program management information.

Then, the process transitions to another mutual authentication operation (second mutual authentication operation) between the user terminal 10 and the server 20. The other mutual authentication operation between the user terminal 10 and the server 20 may use a common secret key scheme or a common key scheme. When the common secret key scheme is used, the common secret key information Kcs is shared between the user terminal 10 and the server 20. Alternatively, the secret key information Ksc corresponding to the public key information Kpb will be used. In this case, there is no difference in operational steps except that the public key information Kpb is used for encryption and the secret key information Ksc is used for decryption. The mutual authentication operation between the user terminal 10 and the server 20 using a common secret key scheme will be described below.

The user terminal 10 and the server 20 shares in advance the common secret key information Kcs. Based on the common secret key information Kcs, a mutual authentication is performed between the server 20 and the user terminal 10. If it is determined that the mutual authentication operation is successful, then the server 20 and the user terminal 10 generate session key information Ksa (step S106).

Then, the server 20 reads program information P from the program database 211 and transmits the encrypted program information Enc (Ksa:P) that is encrypted with the session key information Ksa to the user terminal 10 (step S107). Alternatively, the server 20 may receive the media identifier IDm of the read recording medium 16 through the user terminal 10, select appropriate program information P for the recording medium 16 connected to the user terminal 10 based on the program information/media identifier information correlation database 213, and transmit to the user terminal 10 the encrypted program information Enc (Ksa:P) that is encrypted with the session key information Ksa (step S107).

Then, the user terminal 10 receives the encrypted program information Eric (Ksa:P), decrypts the received encrypted program information Eric (Ksa:P) with the session key information Ksa, and generates the program, information P (step S108). Further, the user terminal 10 encrypts again the generated program information P with the session key information Ks1 for use with the recording medium 16 to generate the encrypted program information Enc (Ks1:P), which is transmitted to the recording medium 16 (step S109).

Then, the recording medium 16 receives the encrypted program information Enc (Ks1:P), decrypts the encrypted program information Enc (Ks1:P) received with the session key information Ks1, and stores the program information P in the program memory 162 (step S110).

Besides, the operation of steps S106 to S108 is performed prior to the operation of steps S101 to S105, after which the process may proceed in the order: step S101, step S109, and step S110.

The program information P stored in the recording medium 16 includes information to check the validity of the information (e.g., a hash value). For example, if the hash value is not valid, then the program information P is not stored in the program memory 162. In addition, the program information P used in the validity check may be executed only in the recording medium 16. Further, the program information P includes information to identify operational functions.

Figure 4A:
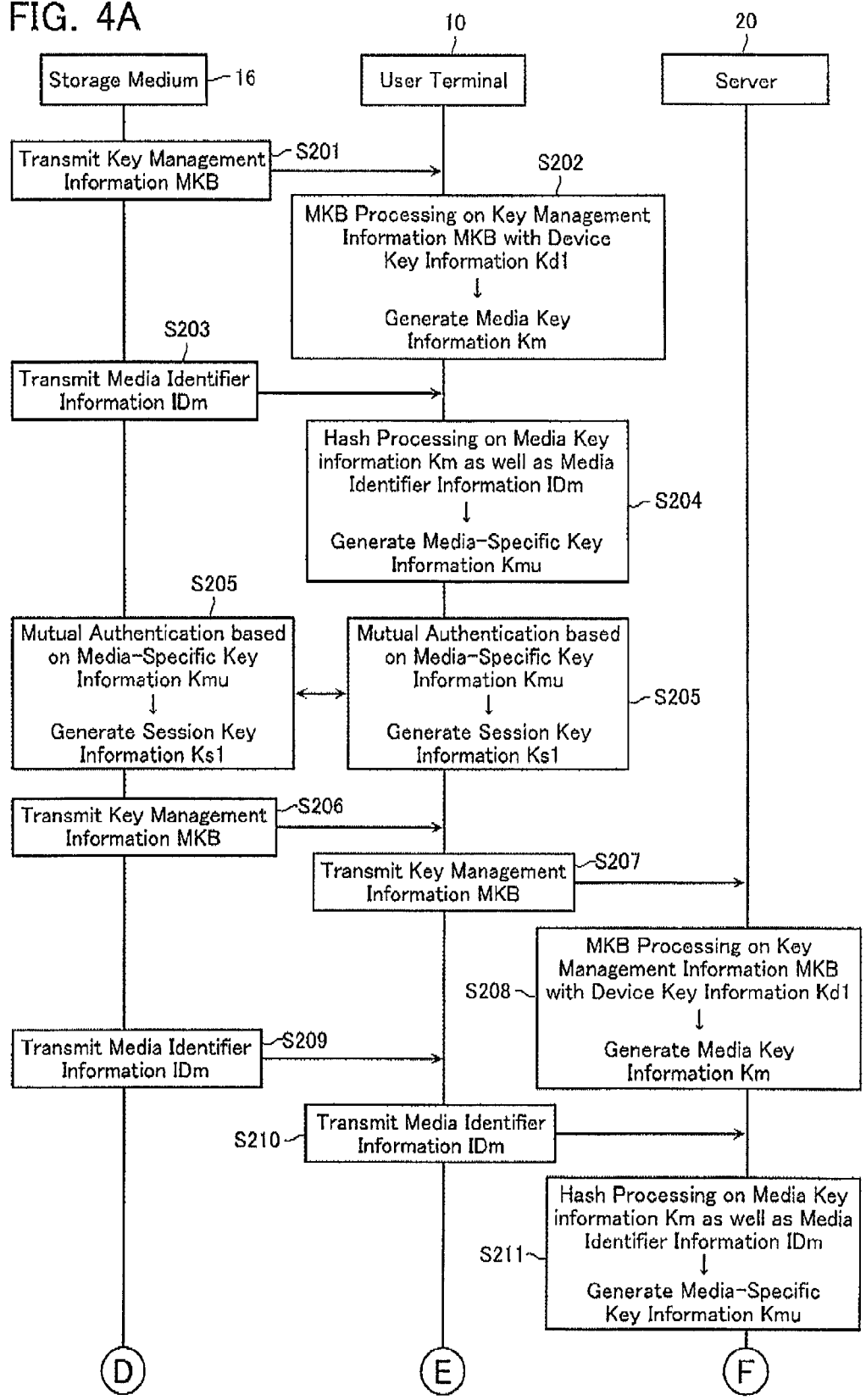
FIG. 4A is a flowchart illustrating operations of the system for providing program information according to the first embodiment of the present invention.
Figure 4B:
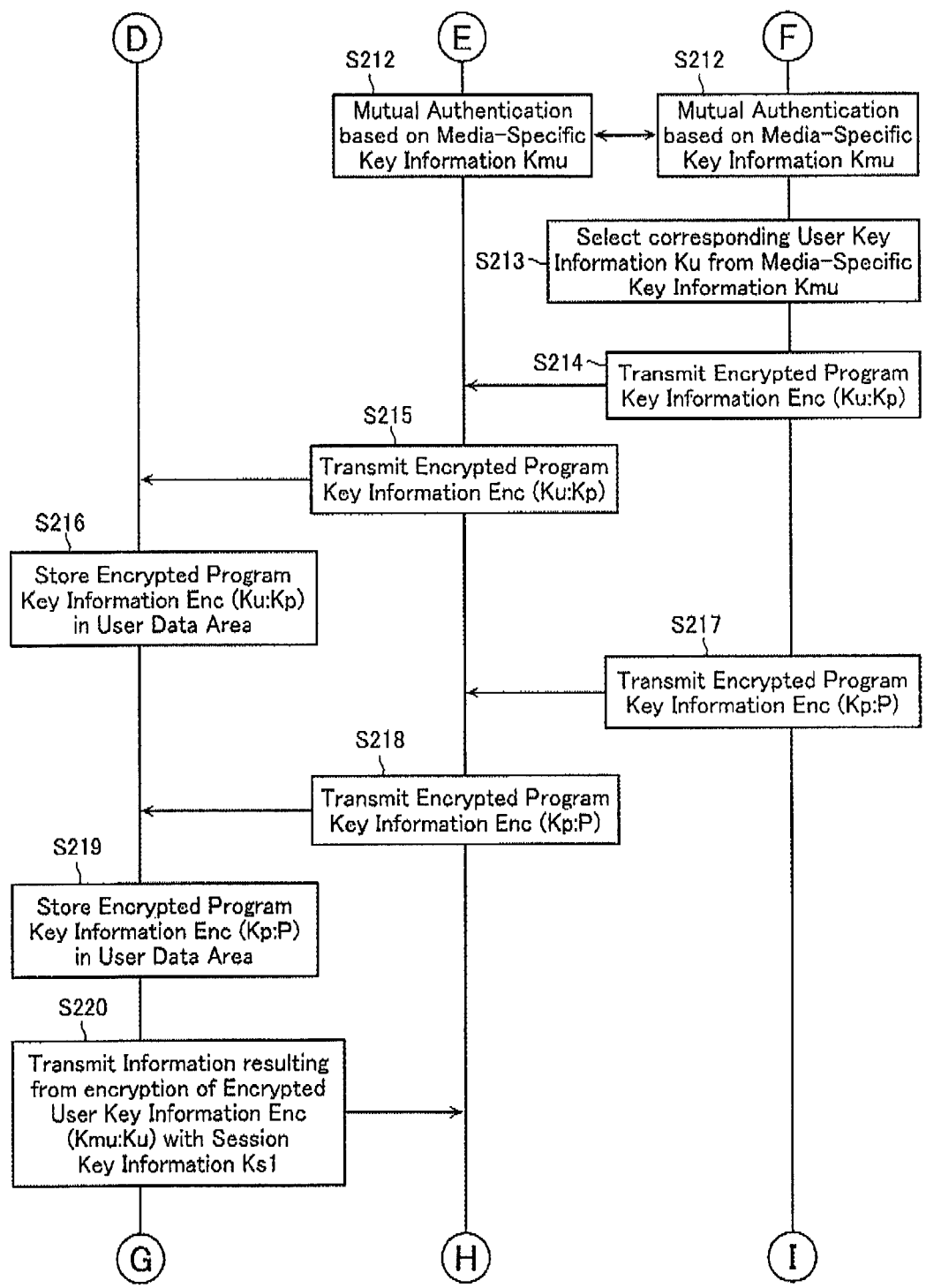
FIG. 4B is a flowchart illustrating operations of the system for providing program information according to the first embodiment of the present invention.
Figure 4C:
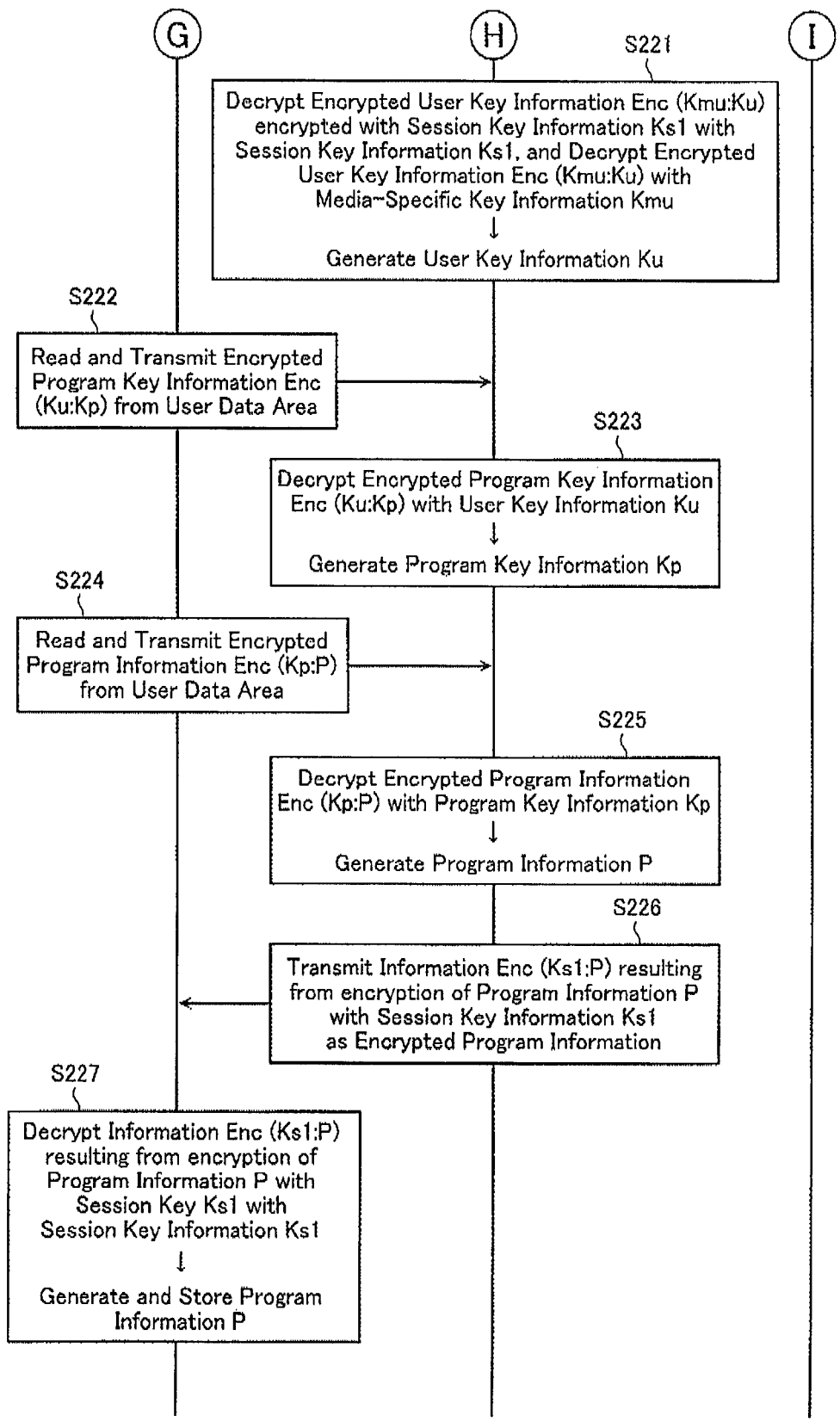
FIG. 4C is a flowchart illustrating operations of the system for providing program information according to the first embodiment of the present invention.

About Mutual Authentication Operation (Second Mutual Authentication Operation) between the storage medium 16 and the server 20, other embodiments will now be described below with reference to FIGS. 4A to 4C. The operation of steps S201 to S205 in FIGS. 4A to 4C (first mutual authentication operation) is the same as that of steps S101 to S105 in FIGS. 3A and 3B.

After step S205, the recording medium 16 transmits the key management information MKB to the user terminal 10 (step S206). Then, upon receipt of the key management information MKB, the user terminal 10 transmits it to the server 20 without any change (step S207).

Then, the server 20 receives the key management information MKB from the user terminal 10, performs MKB processing on the received key management information MKB with the device key information Kd, and generates media key information Km (step S208).

Subsequent to step S208, the recording medium 16 transmits the media identifier information IDm to the user terminal 10 (step S209). Then, upon receipt of the media identifier information IDm, the user terminal 10 transmits it to the server 20 without any change (step S210).

Then, the server 20 receives the media identifier information IDm from the user terminal 10, performs hash processing on the media key information Km as well as the media identifier information IDm, and generates media-specific key information Kmu (step S211). Upon completion of step S211, the media-specific key information Kmu is shared between the recording medium 36 and the server 20.

Then, the server 20 and the recording medium 16 perform a mutual authentication, each based on the media-specific key information Kmu generated in step S121 and the media-specific key information Kmu stored in the hidden area 164b, respectively (step S212). If the mutual authentication operation is successful, the server 20 recognizes the user terminal 10 as a legitimate terminal.

In this way, the mutual authentication operation (second mutual authentication operation) is completed between the user terminal 10 and the server 20, which results in completion of all authentications between the server 20 and the recording medium 16 through the user terminal 10. This enables the program information P from the server 20 to be stored in the recording medium 16 without any masquerading. In this embodiment, the description is made to a method other than the cryptographic communications based on the session key information Ks.

Then, using the media identifier information IDm transmitted to the server 20, the server 20 ascertains user key information Ku corresponding to the recording medium 16 based on the user key/media identifier information correlation database 215 (step S213). Then, the server 20 encrypts the program key information Kp with the user key information Ku and transmits encrypted program key information Enc (Ku:Kp) to the user terminal 10 (step S214). Although communications used between the server 20 and the user terminal 10 may be cryptographic communications based on the session key information Ks, the encrypted program key information Enc (Ku:Kp) is essentially secure without such cryptographic. communications. This is because the encrypted program key information Enc (Ku:Kp) is specific to the recording medium 16 in which a mutual authentication operation has been established, and hence cannot be used in other recording media even if stolen during communication.

Then, the user terminal 10 receives the encrypted program key information Enc (Ku:Kp) and transmits the encrypted program key information Enc (Ku:Kp) to the recording medium 16 without any change (step S215). The recording medium 16 stores the encrypted program key information Enc (Ku:Kp) received in the user data area 164d (step S216).

Then, the server 20 reads the program information P from the program database 211 and transmits the encrypted program information Enc (Kp:P) that is encrypted with corresponding program key information Kp to the user terminal 10 (step S217), Alternatively, if the encrypted program information Enc (Kp:P) is already stored in the program database 211, then the server 20 reads the encrypted program information Enc (Kp:P) and transmits it to the user terminal 10. Although communications used between the server 20 and the user terminal 10 may be cryptographic communications based on the session key information Ks, the encrypted program key information Enc (Ku:Kp) is essentially secure without such cryptographic communications. This is because the encrypted program information Enc (Ku:Kp) itself has already been encrypted and hence cannot be decrypted even if stolen during communication.

Then, the user terminal 10 receives the encrypted program information Enc (Kp:P) and transmits it to the recording medium 16 without any change (step S218). Thereafter, the recording medium 16 stores the encrypted program information Enc (Kp:P) received in the user data area 164d of the memory cell array 164 (step S219).

Then, the description is made to a method for deploying the encrypted program information Enc (Ku:P) in the program memory 162 of the recording medium 16. The user terminal 10 and the recording medium 16 are able to access the protected area 164c in the recording medium 16 since the first authentication operation of steps S201 to S205 as mentioned above has been completed. The user terminal 10 orders the recording medium 16 to read encrypted user key information Enc (Kmu:Ku). The recording medium 16 transmits to the user terminal 10 information from the protected area 164c that results from encryption of the encrypted user key information Enc (Kmu:Ku) with a session key Ks1 (step S220).

Then, the user terminal 10 generates user key information Ku by decrypting such information with the session key Ks1 that result from encryption of the encrypted user key information Enc (Kmu:Ku) received with the session key Ks1, obtaining the encrypted user key information Enc (Kmu:Ku), and, further decrypting the encrypted user key information Enc (Kmu:Ku) with the shared media-specific key information Kmu (step S221).

Then, the user terminal 10 orders the recording medium 16 to read the encrypted program key information Enc (Ku:Kp). The recording medium 16 transmits the encrypted program key information Enc (Ku:Kp) from the user data area 164d to the user terminal 10 (step S222).

The user terminal 10 decrypts the encrypted program key information Enc (Ku:Kp) received with the user key information Ku to generate program key information Kp (step S223). Then, the user terminal 10 orders the recording medium 16 to read the encrypted program information Enc (Kp:P). The recording medium 16 transmits the encrypted program information Enc (Kp:P) from the user data area 164d to the user terminal 10 (step S224).

The user terminal 10 decrypts the encrypted program information Enc (Kp:P) received with the program key information Kp to generate the program information P (step S225).

The user terminal 10 issues a command to write the decrypted program information P to the program memory 162 of the recording medium 16 and transmits the encrypted program information Enc (Ks1:P) that results from encryption of the program information P with the session key Ks1 to the recording medium 16 (step S226).

The recording medium 16 decrypts the encrypted program information Enc (Ks1:P) received with the session key Ks1 to store it in the program memory 162 (step S227).

The program information P stored in the recording medium 16 includes information to check the validity of the information (e.g., a hash value). In addition, the program information P may be executed only in the recording medium 16. Further, the program information P includes information to identify operational functions.

In the above-mentioned embodiment, the encrypted program key information Enc (Ku:Kp) and the encrypted program information Enc (Kp:P) are stored in the user data area 164d. The program information P may be stored in the program memory 162 at any time after completion of the first mutual authentication operation of steps S101 (S201) to S105 (S205). When those areas other than the base program are configured by a RAM in the program memory 162, the program information P needs to be stored each time in the program memory 162. In this case, however, it is advantageous that there is no need to communicate with the server 20 at that moment. In addition, only a portion Pi of the program information P may be selected to be stored in the program memory 162.

Referring now to FIG. 7, the description is made to the mutual authentication operation of, step S105 illustrated in FIG. 3. The mutual authentication operation of step S105 is the so-called AKE (Authentication and Key Exchange) operation. Firstly, in the mutual authentication operation, the user terminal 10 transmits information to the recording medium 16 to request transmission of first random number information Ra1 (step S301).

Secondly, the recording medium 16 generates the first random number information Ra1 (step S302) and transmits it to the user terminal 10 (step S303).

Then, the user terminal 10 receives the first random number information Ra1 (step S304), generates second random number information Ra2 (step S305), and transmits it to the recording medium 16 (step S306).

Then, the recording medium 16 receives the second random number information Ra2 (step S307) and transmits a notice of completion of receipt for the second random number information to the user terminal 10 indicating that the second random number information Ra2 has been received (step S308).

Then, the user terminal 10 transmits information to the recording medium 16 to request transmission of second reply information Re2 (step S309).

Then, the recording medium 16 transmits information Enc (Kmu:Ra2), which results from encryption of the second random number information Ra2 with the media-specific key information Kmu, to the user terminal 10 as the second reply information Re2 (step S310).

Then, the user terminal 10 decrypts the second reply information Re2 (information Enc (Kmu:Ra2)) with the media-specific key information Kmu generated at the user terminal 10 (step S104 in FIG. 3) (step S311). Thereafter, the user terminal 10 determines whether the decryption result is equal to the second random number information Ra2 (step S312). Here, if it determined by the user terminal 10 that the decryption result is not equal to the second random number information Ra2 (N branch at step S312), then the mutual authentication is determined to be unsuccessful and the mutual authentication operation is terminated. On the other hand, if it is determined by the user terminal 10 that the decryption result is equal to the second random number information Ra2 (Y branch at step S312), then the process proceeds to the next operation. The user terminal 10 transmits information Eric (Kmu:Ra1), which results from encryption of the first random number information Ra1 with the media-specific key information Kmu, to the recording medium 16 as first reply information Re1 (step S313).

Then, the recording medium 16 decrypts the first reply information Re1 (information Enc (Kmu:Ra1)) with the media-specific key information Kmu stored in the hidden area 164b (step S314). Then, the user terminal 10 determines whether the decryption result is equal to the first random number information Ra1 (step S315). Here, if it is determined by the recording medium 16 that the decryption result is not equal to the first random number information Ra1 (N branch at step S315), then the mutual. authentication is determined to be unsuccessful and the mutual authentication operation is terminated. On the other hand, if it is determined by the recording medium 16 that the decryption result is equal to the first random number information Ra1 (Y branch at step S315), then the process still proceeds to the next operation. The recording medium 16 transmits mutual authentication result information to the user terminal 10 indicating that the mutual authentication operation is successful (step S316). Then, the recording medium 16 generates session key information Ks (step S317).

On the other hand, the user terminal 10 receives the mutual authentication result information (step S318) and generates session key information Ks (step S319). The session key information Ks is generated under a predefined method, based on the first random number information Ra1, the second random number information Ra2, and the media-specific key information Kmu. Alternatively, the session key information Ks may be generated based on the first random number information Ra1 and the media-specific key information Kmu, or the second random number information Ra2 and the media-specific key information Kmu. Besides, in the mutual authentication operation of step S110 in FIG. 3, the operation similar to that described in steps S201 to S219 in FIG. 6 is performed between the recording medium 16 and the server 20 through the user terminal 10. That is, the first random number information Ra1 and the second random number information Ra2 are first shared between the recording medium 16 and the server 20. Then, the first random number information Ra1 or the second random number information Ra2 is encrypted with the media-specific key information Kmu, and the encrypted reply information is transmitted/received between the recording medium 16 and the server 20. Thereafter, if it is determined that the result of the reply information being decrypted with the media-specific key information Kmu is equal to the first random number information Ra1 and the second random number information Ra2, then the mutual authentication is determined to be successful and session key information is generated, accordingly.

As can be seen from the above, according to the system for providing program information in the first embodiment of the present invention, the recording medium 16 may perform a mutual authentication operation with the user terminal 10 and then perform another mutual authentication operation with the server 20. If it is determined that the other mutual authentication operation is successful, additional program information may be transmitted to the recording medium 16 and stored in the program memory 162 of the recording medium 16 in an encrypted form. Therefore, the system for providing program information according to the first embodiment of the present invention may securely store to the recording medium 16 such program information, for which functions are updated and added to, while preventing masquerading, manipulation, etc.

Second Embodiment

Figure 9:
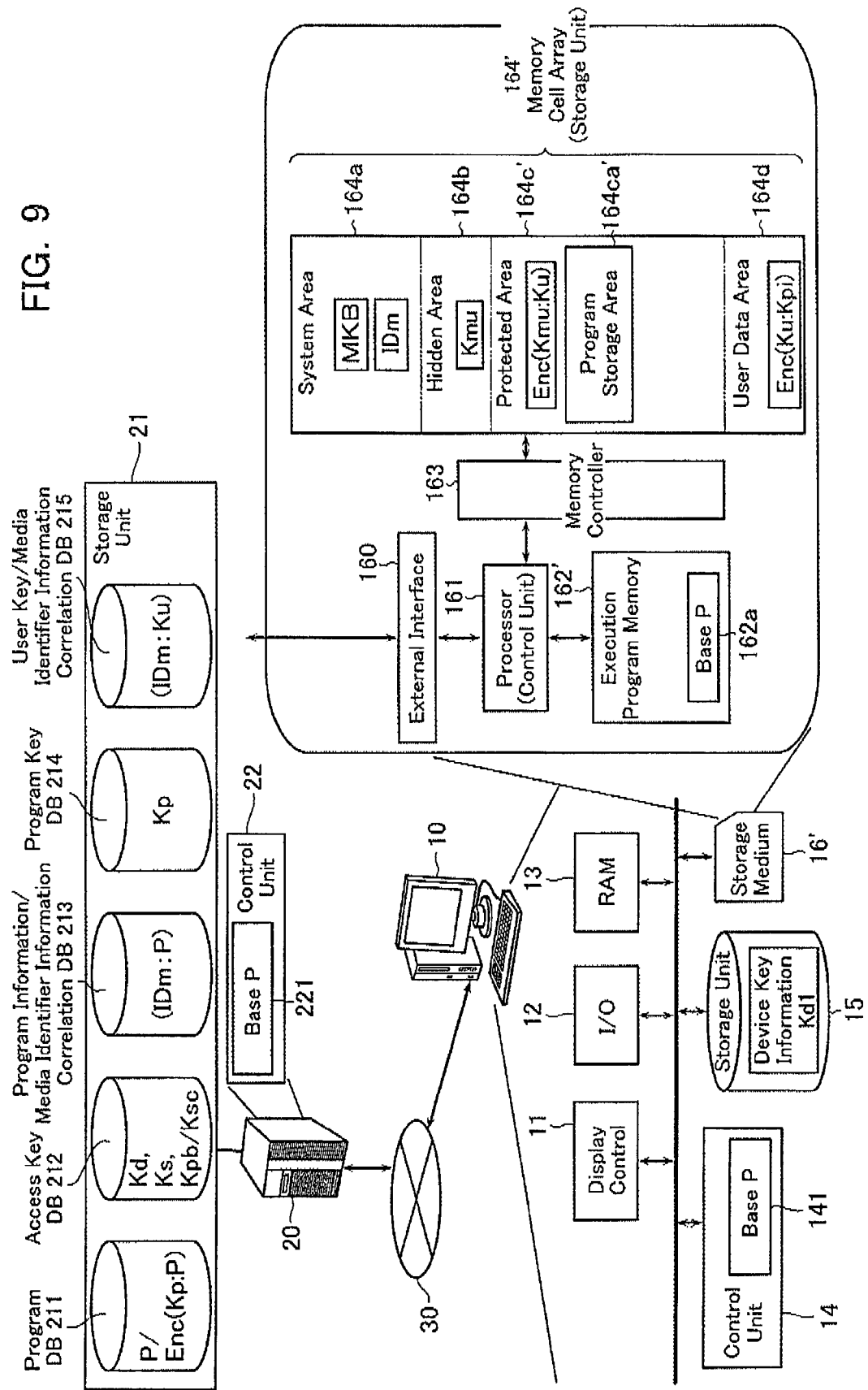
FIG. 9 is a schematic diagram of a system for providing program information according to a second embodiment of the present invention.

Referring now to FIG. 9, the description is made to a system for providing program information according to a second embodiment of the present invention. FIG. 9 is a schematic diagram of the system for providing program information according to the second embodiment. Besides, in the second embodiment, the same reference numerals refer to the same components as the first embodiment and description thereof will be omitted.

As illustrated in FIG. 9, the system for providing program information according to the second embodiment differs from the first embodiment in the configuration of a recording medium 16'.

The recording medium 16' includes an execution program memory 162', instead of the program memory 162. In addition, the recording medium 16' has a program storage area 164ca' in which the encrypted program information Enc (Kp: P) is stored, in addition to an area where an encrypted user key Enc (Kmu:Ku), encrypted program key information Enc (Ku: Kp), etc., are stored to a protected area 164c' in a memory cell array 164'.

The execution program memory 162' includes a volatile memory such as an SRAM. The execution program memory 162' reads base program 162a from the memory cell array 164' and temporarily stores that base program 162a. Alternatively, the execution program memory 162' reads the decrypted program information P from the program storage area 164ca' in response to requests from the processor 161 and temporarily stores that program information P.

The program information P received from the server 20 via the memory controller 163 is stored in the program storage area 164ca' as needed.

If respective mutual authentication operations are successful between the recording medium 16' and the user terminal 10 as well as between the recording medium 16' and the server 20, then the processor 161 of the recording medium 16' encrypts the received program information P and stores it in the program storage area 164ca' via the memory controller 163.

According to the system for providing program information according to the second embodiment as described above, the same effects may be obtained as the first embodiment. In addition, the recording medium 16' according to the second embodiment includes the execution program memory 162' with a volatile memory such as an SRAM, instead of the program memory 162 including the NOR-type EEPROM of the first embodiment. Therefore, according to the second embodiment, the recording medium 16' may be manufactured at lower cost than the recording medium 16 of the first embodiment.

Third Embodiment

Figure 10:
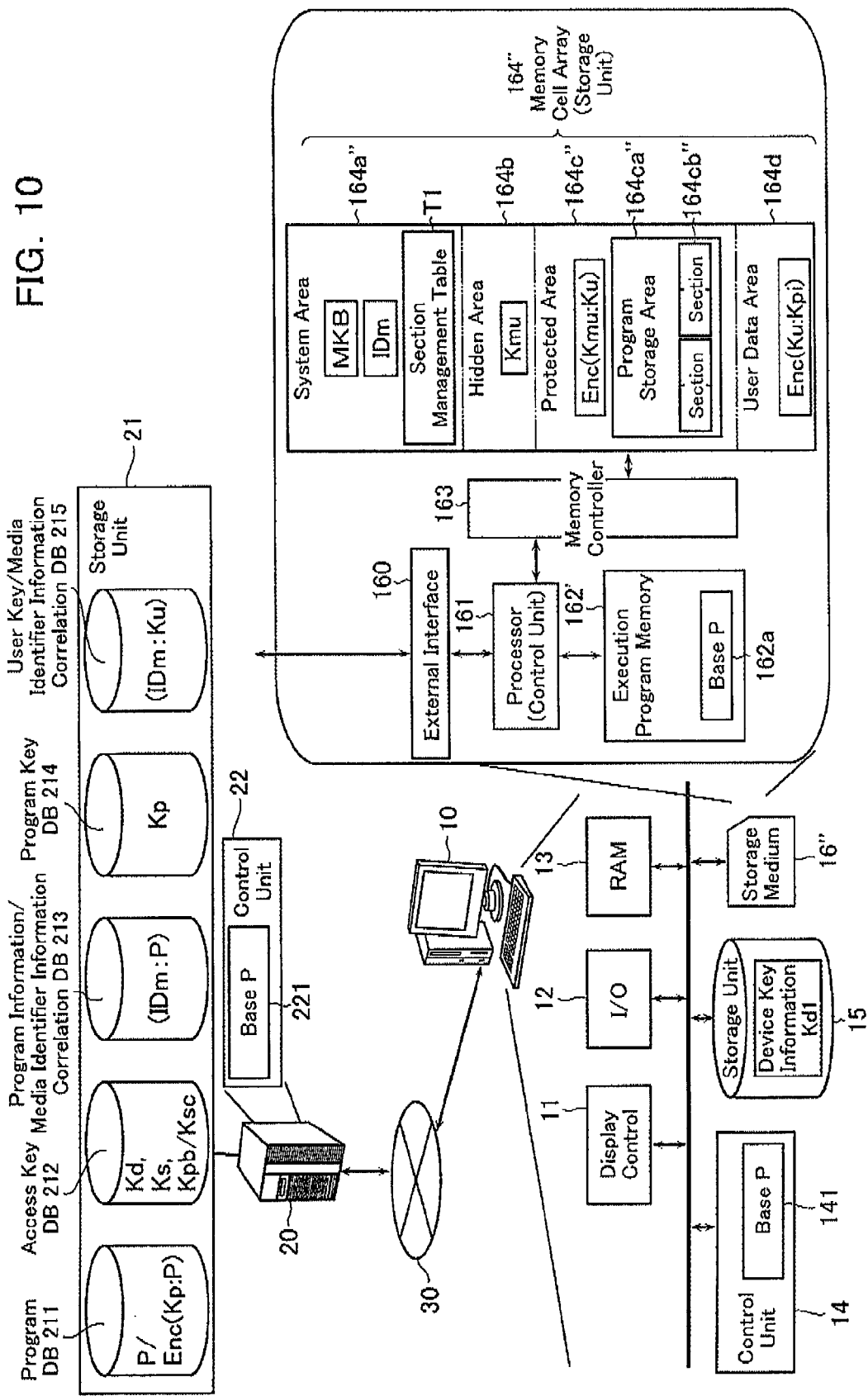
FIG. 10 is a schematic diagram of a system for providing program information according to a third embodiment of the present invention.

Referring now to FIG. 10, the description is made to a system for providing program information according to a third embodiment of the present invention. FIG. 10 is a schematic diagram of the system for providing program information according to the third embodiment, Besides, in the third embodiment, the same reference numerals refer to the same components as the first and second embodiments and description thereof will be omitted.

As illustrated in FIG. 10, the system for providing program information according to the third embodiment differs from the second embodiment in the configuration of a recording medium 16".

The third embodiment differs from the second embodiment in each configuration of a system area 164a" and a protected area 164c" in the recording medium 16".

Stored in the system area 164a" are key management information MKB, media identifier information IDm, and a section management table T1. Wherein, the section management table T1 contains information to set a program information storage section 164cb" in which the program information P received from the server 20 is stored as a program storage area 164ca" in the protected area 164c".

The protected area 164c" stores the encrypted user key information Enc (Kmu:Ku). In addition, the protected area 164c" is provided with program storage area 164ca". Further, the program storage area 164ca' has a plurality of program information storage sections 164cb" to store the encrypted program information P that is received from the server 20. If a memory cell array 164" is a NAND-type EEPROM, the common access unit is 512 or 1024 Bytes and the program information storage section 164cb" is correspondingly set to 4096 Bytes, etc. In the above-mentioned configuration, for example, when two pieces of program information are stored in the recording medium 16", one of the program information is stored in a first program information storage section and the other stored in a second program information storage section.

If respective mutual authentication operations are successful between the recording medium 161" and the user terminal 10 as well as between the recording medium 16" and the server 20, then the processor 161 of the recording medium 16" reads the section management table T1 from the system area 164a". Based on the section management table T1, the processor 161 notifies the memory controller 163 of the program information storage section 164cb" in which the received program information P is stored. The memory controller 163 encrypts the received program information P, and then specifies an address to be stored in the notified program information storage section 164cb".

According to the system for providing program information of the third embodiment described above, the same effects may be obtained as the second embodiment.

Although the embodiments of the present invention have been described as above, the present invention is not intended to be limited to the disclosed embodiments and various other changes, additions, or replacements can be made therein without departing from the sprit of the invention. Although the program key information Kp, the encrypted program information Enc (Kp:P), and the user key information Ku are collectively managed by the single server 20 in the above embodiments, other configurations may be used where the program key information Kp, the encrypted program information Enc (Kp:P), and the user key information Ku are separately managed by multiple servers.

What is claimed is:

1. A system for providing program information comprising: a user terminal managed by a user, a recording medium capable of reading information therefrom and writing information thereto through a command issued by the user terminal, and a server connected to the user terminal via a network, the system providing program information from the server to the recording medium, wherein the recording medium has a first storage unit capable of writing program information thereto, and a first control unit capable of performing a first mutual authentication operation with the user terminal and executing a command to write program information to the first storage unit only if the first mutual authentication operation is successful, the first storage unit of the recording medium stores media identifier information specific to the recording medium, key management information resulting from encryption in a predetermined format of media key information capable of being generated based on the media identifier information, and media-specific key information resulting from decryption of the media key information with the media identifier information, the first control unit of the recording medium performs a mutual authentication operation with the user terminal based on the media-specific key information, the user terminal comprises a second storage unit storing device key information and secret key information for the server, and a second control unit performing the mutual authentication operation with the recording medium, the second control unit of the user terminal:
generates media key information from the received key management information based on the device key information,
generates media-specific key information from the media key information based on the received media identifier information, and
performs the mutual authentication operation with the recording medium using the generated media-specific key information, the server comprises a third storage unit storing secret key information for the user terminal or public key information, and a third control unit performing the mutual authentication operation with the recording medium, the third storage unit of the server stores program key information, program-key-encrypted program information resulting from encryption of the program information with the program key information, and correlation information correlating the media identifier information with different user key information for each user, the third control unit of the server generates, based on the correlation information, user-key-encrypted program key information resulting from encryption of the program key information with user key information corresponding to the media identifier information of the recording medium if a second mutual authentication operation with the user terminal is successful, and transmits the user-key-encrypted program key information and the program-key-encrypted program information to the user terminal, the user terminal performs the second mutual authentication operation with the server, obtains program information transmitted from the server if the second mutual authentication operation is successful, and issues a command to write the program information to the first storage unit of the recording medium, the third control unit of the server performs the mutual authentication operation with the user terminal based on the secret key information or public key information, the second control unit of the user terminal:
  transmits to the recording medium the program-key-encrypted program information and the user-key-encrypted program key information received from the server,
  generates the first common key information if the first mutual authentication operation with the recording medium is successful,
  receives from the recording medium the program-key-encrypted program information, the user-key-encrypted program key information, and encrypted user key information resulting from encryption of the user key information with the media-specific key information and the first common key information,
  decrypts the encrypted user key information with the first common key information and the media-specific key information to generate user key information,
  generates the program information based on the user key information, the program-key encrypted program information, and the user-key-encrypted program key information, and
  transmits to the recording medium first common key encrypted program information resulting from encryption of the program information with the first common key information, the first storage unit of the recording medium stores in advance information resulting from encryption of the user key information with the media-specific key information, and the program-key-encrypted program information and the user-key-encrypted program key information received from the user terminal, the first control unit of the recording medium:
  generates the first common key information if the first mutual authentication operation with the user terminal is successful,
  transmits to the user terminal the encrypted user key information, the program-key-encrypted program information, and the user-key-encrypted program key information,
  decrypts the first common key encrypted program information received from the user terminal with the first common key information to generate the program information, and
  stores the program information in the first storage unit.

2. The system for providing program information according to claim 1, wherein
  the key management information results from encryption of the media key information with device-key matrix information having matrix elements and multiple pieces of encrypted information corresponding to the matrix elements,
  the device key information has vector information for specifying multiple ones of the matrix elements and decryption information for decrypting the encrypted information corresponding to the vector information, and
  the second control unit of the user terminal uses the device key information to decrypt all of the encrypted information of the key management information identified by the vector information with decryption information, and generates the media key information if all of the decrypted information are not equal to predetermined invalid information.

3. The system for providing program information according to claim 1, wherein the first mutual authentication operation comprises:
  requesting first random number information from the user terminal to the recording medium;
  generating, in the recording medium, the first random number information and transmitting the first random number information to the user terminal;
  generating, in the user terminal, second random number information, transmitting the second random number information to the recording medium, and requesting second reply information corresponding to the second random number information from the recording medium;
  transmitting, from the recording medium, information resulting from encryption of the second random number information based on the media-specific key information to the user terminal as the second reply information;
  decrypting, in the user terminal, the received second reply information based on the generated media-specific key information, and, if the decryption result is equal to the second random number information, transmitting to the recording medium first reply information resulting from encryption of first random number information obtained from the recording medium based on the generated media-specific key information; and
  decrypting, in the recording medium, the received first reply information based on the media-specific key information, and, if the decryption result is equal to the first random number information, determining a mutual authentication operation to be successful, and transmitting to the user terminal, information indicating that the mutual authentication operation results in success.

4. The system for providing program information according to claim 1, wherein
  the first storage unit of the recording medium stores media identifier information with such information about a manufacturer of the recording medium and its version added thereto, the second control unit of the user terminal reads the media identifier information from the first storage unit of the recording medium and transmits the media identifier information to the server, the third storage unit of the server stores multiple pieces of program information corresponding to the manufacturer of the recording medium and its version, and the third control unit of the server selects and transmits program information appropriate for the recording medium based on media identifier information received from the user terminal.

5. The system for providing program information according to claim 4, wherein common key information is generated based on the first random number information, the second random number information, and the media-specific key information.

6. The system for providing program information according to claim 4, wherein common key information is generated based on any one of the first random number information and the second random number information, and the media-specific key information.

7. The system for providing program information according to claim 1, wherein program information transmitted to the recording medium includes information to check the validity of the program information.

8. The system for providing program information according to claim 1, wherein program information transmitted to the recording medium includes information to identify the program information.

9. The system for providing program information according to claim 1, wherein the first storage unit of the recording medium stores a section management table associated with sections capable of storing information within the first storage unit, the first control unit of the recording medium stores the program information to the first storage unit based on the section management table in response to the transmitted program information from the server.

* * * * *